United States Patent

Kubota et al.

[11] Patent Number: 5,118,784
[45] Date of Patent: Jun. 2, 1992

[54] POLY-GAMMA-GLUTAMIC ACID ESTER AND SHAPED BODY THEREOF

[75] Inventors: Hidetoshi Kubota; Yoshimasa Fukuda; Hidehi Takebe; Takeshi Endo, all of Yokohama, Japan

[73] Assignee: Meiji Seika Kabushiki Kaisha, Tokyo, Japan

[21] Appl. No.: 653,222

[22] Filed: Feb. 8, 1991

[30] Foreign Application Priority Data

Feb. 8, 1990 [JP] Japan .................................. 1-28754

[51] Int. Cl.$^5$ .......................................... C08G 69/10
[52] U.S. Cl. .................................... 528/328; 528/310
[58] Field of Search ................................ 528/328, 310

[56] References Cited

U.S. PATENT DOCUMENTS 3,119,794  1/1964  de Vries et al. ..................... 528/328

Primary Examiner—Harold D. Anderson
Attorney, Agent, or Firm—Wenderoth, Lind & Ponack

[57] ABSTRACT

Disclosed is a poly-γ-glutamic acid ester comprising recurring units represented by the following formula (A):

$$\mathrm{+NHCHCH_2CH_2CO+} \atop | \atop \mathrm{COOR} \quad (A)$$

wherein R represents an ester-forming group, and recurring units represented by the following formula (B):

$$\mathrm{+NHCHCH_2CH_2CO+} \atop | \atop \mathrm{COOH} \quad (B)$$

wherein the former units (A) occupy at least 40% and the polymerization degree, that is, the total number of both the units (A) and (B), is at least 1000.

7 Claims, No Drawings

POLY-GAMMA-GLUTAMIC ACID ESTER AND SHAPED BODY THEREOF

BACKGROUND OF THE INVENTION (1) Field of the Invention

The present invention relates to esters of a poly-γ-glutamic acid and a shaped body of a polymer composed mainly of esters of a poly-γ-glutamic acid.

(2) Description of the Related Art

It is difficult to obtain a polymer having a high degree of polymerization, in which the carboxyl group at the γ-position of glutamic acid is intermolecularly amido-bonded to the amino group at the α-position, by chemical synthetic means. However, the present inventors succeeded in advantageously preparing poly-γ-glutamic acid (sometimes referred to as "γ-PGA" hereinafter) by utilizing fermentative production by microorganisms. Accordingly, there is no hindrance to the supply of this polymer, which is expected to be applicable to various uses in view of inherent properties as a polyamide, that is, 4-nylon, and characteristics brought about by the carboxylate group at the α-position.

However, γ-PGA is generally poor in the solubility in solvents and is soluble only in dimethyl sulfoxide (DMSO) and water only when γ-PGA is an alkali metal salt (e.g. sodium or potassium salt). Furthermore, the melting point of γ-PGA is high or the optimum melting temperature range of γ-PGA is narrow, though the melting point or the optimum melting temperature range differs to some extent according to the polymerization degree. Accordingly, the melt-shaping method customarily adopted for polyamides is not easily applicable to γ-PGA.

In order to obtain a film or fiber from γ-PGA, γ-PGA is once dissolved in a solvent and then, the polymer is shaped into a film or a fiber. Herein, formation of a yarn from a solution or molten liquid, that is, so-called "spinning", is included in "shaping". However, so far as the present inventors know, it is not easy to obtain a good film or fiber from γ-PGA. In the case where DMSO or water is used as the solvent, only a solid, thick, brittle and opaque film is obtained, or spinning per se is difficult and formation of a fiber is not easy. As pointed out hereinbefore, the solubility of γ-PGA in solvents other than DMSO and water, especially in organic solvents suitable for shaping, is generally poor, and it is difficult to improve the shapability of γ-PGA into a film or fiber.

SUMMARY OF THE INVENTION

The present inventors made investigations with a view to overcoming the foregoing defects, and as the result, it was found that if the carboxyl group at the α-position of glutamic acid in γ-PGA is esterified, the solubility in solvents can be increased and a shaped body having excellent properties can be obtained from a solution of this modified γ-PGA. The present invention has now been completed based on this finding.

More specifically, in accordance with the present invention, there is provided a poly-γ-glutamic acid ester comprising recurring units represented by the following formula (A):

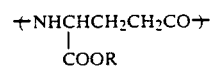

wherein R represents an ester-forming group, and recurring units represented by the following formula (B):

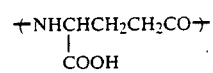

wherein the former units (A) occupy at least 40% and the polymerization degree, that is, the total number of both the units (A) and (B), is at least 1000.

Furthermore, in accordance with the present invention, there is provided a shaped body of a poly-γ-glutamic acid ester, which is composed of a polymer comprising a poly-γ-glutamic acid ester as mentioned above as the main component, and is in the form of a film or a fiber.

Esters of poly-γ-glutamic acid according to the present invention have a much higher solubility than poly-γ-glutamic acid.

The shaped body composed of a polymer comprising this poly-γ-glutamic acid ester as the main component according to the present invention is excellent in various properties such as strength, transparency and elasticity.

In the present invention, the esterification degree of the poly-γ-glutamic acid ester can be controlled very easily. Accordingly, various esters and shaped bodies differing in properties can be obtained by controlling the esterification degree of the poly-γ-glutamic acid ester.

DETAILED DESCRIPTION OF THE INVENTION

Poly-γ-Glutamic Acid and Preparation Thereof

One embodiment of the preparation of the poly-γ-glutamic acid ester of the present invention is esterification of γ-PGA (described in detail hereinafter). This γ-PGA has a structure in which the carboxyl group at the γ-position of glutamic acid is intermolecularly amido-bonded to the amino group at the α-position.

This γ-PGA can be obtained according to various processes, for example, the chemical synthesis process, the fermentation process and the semichemical synthesis process. For example, according to the present invention, γ-PGA can be obtained by the fermentative production by microorganisms. In the present invention, γ-PGA prepared according to this process is especially preferably used.

The process utilizing microorganisms is described in detail, for example, in Japanese Patent Laid-Open Publication No. 174397/1989. The process is outlined below.

A γ-PGA-producing bacterium is cultured in a nutrient medium comprising yeast extract, peptone, urea, $K_2HPO_4$ and an amino acid at 37° C. for 2 to 3 days, and a large quantity of γ-PGA can be recovered from the culture product.

Poly-γ-Glutamic Acid Ester and Preparation Thereof

The poly-γ-glutamic acid ester of the present invention comprises recurring units represented by the following formula (A):

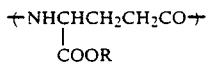

(A)

wherein R represents an ester-forming group, and recurring units represented by the following formula (B):

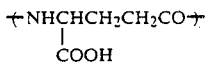

(B)

in which the former units (A) occupy at least 40% and the polymerization degree, that is, the total number of both the units (A) and (B), is at least 1000.

As the ester-forming group R, there can be mentioned linear or branched, saturated or unsaturated, unsubstituted or substituted aliphatic hydrocarbon residues having 1 to about 30 carbon atoms, preferably 1 to about 4 carbon atoms, and unsubstituted or substituted alicyclic, aromatic, aromatic-aliphatic and aliphatic-aromatic hydrocarbon residues.

As typical instances of the ester-forming group R, there can be mentioned a lower alkyl group, a phenyl group, a lower alkyl-substituted phenyl group and a phenyl-lower-alkyl group. The term "lower alkyl" is intended to mean a straight or branched alkyl group of from 1 to 6 carbon atoms.

As the substituent, there can be mentioned (a) a halogen atom such as chlorine, bromine or fluorine, (b) a nitro group, (c) a cyano group, (d) a carboalkoxy, carboaryloxy or carboaralkoxy group (typically, the alkyl group has 1 to about 4 carbon atoms, the aryl group has about 6 to about 10 carbon atoms and the aralkyl group has about 6 to about 10 carbon atoms as a whole), (e) a mono- or di-alkylamino group (typically, the alkyl group has 1 to about 4 carbon atoms), and (f) an acylamino group (typically, the acyl group has 1 to about 5 carbon atoms).

By the term "substituted" in the "substituted hydrocarbon residue" is meant even a hydrocarbon group in which a substituent (preferably a divalent group), such as —O—, —S—, —SO$_2$— or —CO—, is present in the main chain of the hydrocarbon residue.

One process for the preparation of this poly-$\gamma$-glutamic acid ester comprises polymerizing a corresponding monomer or an oligomer thereof. Another and preferable preparation process comprises esterifying $\gamma$-PGA.

The process for the esterification of $\gamma$-PGA is not particularly critical, and any of the known processes can be adopted in the present invention. For example, there can be mentioned following processes using esterifying agents.

(a) A process using as the supply source of the ester-forming group a corresponding diazo compound such as diazomethane or diazodiphenylmethane.

(b) A process comprising a hydrogen halide-removing reaction between a basic substance (for example, an organic base such as a tertiary amine, especially pyridine, triethylamine or dimethylaminopyridine, a base such as dimsyl anion obtained from DMSO and sodium hydride, an alcoholate such as sodium methylate or sodium ethylate or an alkali metal hydroxide such as sodium hydroxide or potassium hydroxide) and a halide of the corresponding group R (such as methyl iodide, methyl bromide or benzyl bromide).

The basic substance may be in the form of a salt with $\gamma$-PGA. Namely, a salt of $\gamma$-PGA with an organic base or alkali metal as mentioned above is isolated in advance and the isolated salt can be subjected to the above-mentioned esterification reaction.

(c) A process comprising activating a carboxylic acid with thionyl chloride or oxalyl dichloride and reacting the activated carboxylic acid with an alcoholate of the corresponding group R.

Esterification of $\gamma$-PGA is accomplished by reacting $\gamma$-PGA with an esterifying agent as mentioned above in a solvent. As the solvent to be used for the esterification, there can be mentioned DMSO, other organic solvents, for example, (a) amides such as dimethylformamide and N-dimethylacetamide, (b) ethers such as dioxane, tetrahydrofuran and diethyl ether, (c) esters such as methyl acetate, ethyl acetate and propyl acetate, (d) halogenated hydrocarbons such as methylene chloride, ethylene chloride and chloroform and (e) amines such as pyridine, trimethylamine and dimethylaminopyridine, and mixtures thereof.

In the esterification of $\gamma$-PGA, it is preferred that $\gamma$-PGA be reacted with an esterifying agent as mentioned above in a solvent as mentioned above at a temperature of $-10°$ to $100°$ C., especially $10°$ to $80°$ C., for 10 minutes to 1 week, especially 30 minutes to 4 days.

The esterification ratio of the poly-$\gamma$-glutamic acid ester, namely, the ratio of recurring units (A) to the sum of the recurring units (A) and (B) can be controlled, for example, by changing the amount of the esterifying agent, the treatment method and the treatment frequency. When a high esterification ratio (for example, 100%) is desired, the desired esterification degree can be attained by repeating the esterification treatment several times.

When the poly-$\gamma$-glutamic acid ester formed by the esterification is obtained in the form of a solution, the polymer can be recovered as solids by precipitation with water or an organic solvent such as chloroform, acetone, ethyl acetate or methanol.

The solubility of the obtained poly-$\gamma$-glutamic acid ester differs even in case of the same solvent according to the kind of the ester-forming group and the esterification ratio. Moreover, even in case of the same ester-forming group and esterification ratio, the solubility differs according to the kind of the solvent. In esters of poly-$\gamma$-glutamic acid according to the present invention, the kind of the ester-forming group and the esterification degree can be appropriately determined according to the kind of the solvent, the solubility, the shaping conditions for the preparation of the shaped body and the intended use. Needless to say, the kind of the ester-forming group and the esterification ratio can be easily determined by carrying out experiments appropriately.

In the polymer of the present invention comprising recurring units (A) and (B), the ratio of recurring units (A) to the sum of recurring units (A) and (B) is 40 to 100 mole %, preferably 60 to 100 mole %, especially preferably 90 to 100 mole %. Recurring units (B) can be utilized for obtaining functional derivatives by further reacting the free carboxyl group of the units (B).

The recurring units (B) expressed as the free carboxyl group may be in the form of a salt, and in the present invention (in interpreting the scope of claims), it is considered that such a state is included in the recurring units (B).

The number of the recurring units (A) and (B) in one molecule, that is, the polymerization degree, is at least 1000, preferably about 5000 to about 10000.

The polymerization degree can be indirectly expressed by the solution viscosity of the poly-γ-glutamic acid ester of the present invention. For example, the intrinsic (20° C.) of the poly-γ-glutamic acid ester in the form of an N-methylpyrrolidone solution containing 2% of lithium chloride is at least 0.1 dl/g, preferably 0.15 to 2.0 dl/g.

Since at least 40 mole % of carboxyl groups of γ-PGA are esterified, the poly-γ-glutamic acid ester of the present invention has a softening point, flow point or melting point of a level necessary or utilizable for the shaping. For example, the softening temperature of the poly-γ-glutamic acid ester in which the carboxyl groups are completely esterified to methyl groups and which has an intrinsic viscosity (as defined above) of 0.25 dl/g is about 100° C.

Shaped Body of Poly-γ-Glutamic Acid Ester

The shaped body of the poly-γ-glutamic acid ester of the present invention is composed of a polymer comprising the above-mentioned poly-γ-glutamic acid ester as the main component and the shaped body is in the form of a film or fiber.

The polymer "comprising" the poly-γ-glutamic acid ester as "the main component" includes not only a polymer composed substantially solely of the poly-γ-glutamic acid ester but also a polymer comprising the poly-γ-glutamic acid ester and other compatible polymer, for example, a polyamide, a polymer having an ester group on the side chain and the like in a small amount, for example, up to 50% by weight based on the sum of this polymer and the poly-γ-glutamic acid ester. Furthermore, these polymers may further comprise auxiliary components for attaining certain effects, for example, a viscosity-reducing agent, a stabilizer, a delustering agent and a colorant.

As pointed out hereinbefore, esters of poly-γ-glutamic acid according to the present invention has an excellent solubility in solvents, and a solution of the poly-γ-glutamic acid ester comprising such components is valuably used as the starting solution for formation of a film or fiber. Preferably, a shaped body of the poly-γglutamic acid ester of the present invention is formed by evaporating the solvent from this poly-γ-glutamic acid ester solution. Needless to say, however, the melt-shaping method can be adopted.

Formation of a film or spinning from the solution or the melt can be accomplished according to conventional procedures.

The film and fiber can be drawn.

The following examples are typical examples of the present invention given for illustrating the present invention in detail. Accordingly, the scope of the present invention is not limited by these examples.

EXAMPLE 1

γ-PGA (1.5 g) was dissolved in dimethyl sulfoxide (50 ml), and 0.15N diazomethane (60 ml) was added to the solution at room temperature (25° C.). After the addition, the mixture was stirred for 60 minutes, and the remaining diazomethane was decomposed by an acid and 600 ml of chloroform was added to the reaction liquid to precipitate a methyl ester of γ-PGA. The ester was recovered in the form of a crystal. The esterification ratio of the product was 100% as measured by the proton nuclear magnetic resonance method. The intrinsic viscosity (20° C.) was 0.25 dl/g as measured with respect to a solution in N-methylpyrrolidone containing 2% of lithium chloride. This crystal was dissolved in dimethylformamide and the temperature was elevated to 150° C. to remove the solvent, whereby a transparent film was obtained.

Measured values of $^1$HNMR (270 MHz, DMSO-d6) of methyl ester of γ-PGA: δ 1.8 (m, 1H, α-CH$_2$), 2.0 (m, 1H, α-CH$_2$), 2.2 (t, 2H, β-CH$_2$), 4.3 (q, 1H, CH), 3.4 (s, 3H, OCH$_3$).

EXAMPLE 2

γ-PGA (1.5 g) was dissolved in dimethylformamide (50 ml), and triethylamine (2.0 g) was added to the solution. The temperature of the reaction liquid was elevated to 60° C. and 5.0 ml of benzyl chloride was added, and reaction was carried out at 60° C. for 48 hours. After the reaction, the reaction liquid was added to 500 ml of water, and a benzyl ester of γ-PGA was obtained in the form of a crystal. As the result of the measurement by the proton nuclear magnetic resonance method, it was confirmed that the esterification ratio was 100%. The intrinsic viscosity (20° C.) was 1.81 dl/g as determined with respect to a solution in N-methylpyrrolidone containing 2% of lithium chloride. The crystal was dissolved in dimethylformamide and the solution was heated at 150° C. for 1 hour to obtain a transparent film. Furthermore, the crystal was dissolved at 120° C. and the solution was drawn in one direction to obtain a fibrous substance.

Measured values of $^1$HNMR (270 MHz, DMSO-d6) of benzyl ester of γ-PGA: δ 1.8 (m, 1H, α-CH$_2$), 2.0 (m, 1H, α-CH2), 2.2 (t, 2H, β-CH$_2$), 4.3 (q, 1H, CH), 5.1 (s, 2H, OCH$_2$), 7.3 (s, 5H, C$_6$H$_5$).

What is claimed is:

1. A poly-γ-glutamic acid ester having a degree of polymerization of at least 1,000 comprising recurring units represented by the following formula:

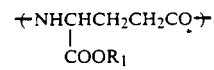

wherein R$_1$ represents a hydrogen atom; a linear or branched, saturated or unsaturated, unsubstituted or substituted aliphatic hydrocarbyl group; or an unsubstituted or substituted alicyclic, aromatic, aromatic-aliphatic or aliphatic-aromatic hydrocarbyl group, at least 40 percent of R$_1$ in the molecule being other than a hydrogen atom.

2. A poly-γ-glutamic acid ester as claimed in claim 1, wherein said aliphatic hydrocarbyl group has 1 to about 30 carbon atoms.

3. A poly-γ-glutamic acid ester as claimed in claim 1, wherein said aliphatic hydrocarbyl group has 1 to about 4 carbon atoms.

4. A poly-γ-glutamic acid ester as claimed in claim 1, wherein said hydrocarbyl group is a lower alkyl group, a phenyl group optionally substituted by a lower alkyl or phenyl-lower-alkyl group.

5. A poly-γ-glutamic acid ester as claimed in claim 1, wherein said hydrocarbyl group is a methyl or benzyl group.

6. A shaped body of a poly-γ-glutamic acid ester, which is composed of a polymer comprising a poly-γ-glutamic ester as claimed in claim 1.

7. A shaped body of poly-γ-glutamic acid ester as claimed in claim 6 in the form of a film or fiber.

* * * * *